United States Patent [19]
Elkins

[11] Patent Number: 4,804,204
[45] Date of Patent: Feb. 14, 1989

[54] REMOTE OPERATED HITCH APPARATUS

[76] Inventor: Johnny C. Elkins, Rte. 5, Box 5124-C, San Angelo, Tex. 76904

[21] Appl. No.: 147,196

[22] Filed: Jan. 22, 1988

[51] Int. Cl.$^4$ .............................................. B60D 1/06
[52] U.S. Cl. ..................................... 280/512; 403/142
[58] Field of Search .............. 280/511, 512, 513, 504; 403/142, 143, 141

[56] References Cited

U.S. PATENT DOCUMENTS

| | | | |
|---|---|---|---|
| 4,133,553 | 1/1979 | Pierce | 280/512 |
| 4,157,190 | 6/1979 | Nyman | 280/512 |
| 4,266,797 | 5/1981 | Rhodes | 280/512 |

*Primary Examiner*—John A. Pekar
*Attorney, Agent, or Firm*—Marcus L. Bates

[57] ABSTRACT

A remote actuator for a trailer hitch of the type having a main body, a ball receiving socket at one end of the main body and the other end of the main body being attachable to the end of a tongue, for example. A pivotal member is hinged at the ball receiving socket end of the hitch. The main body and the pivotal member form hinged sections and the socket is formed jointly in the two hinged sections. A collar is reciprocatingly received about the main body in a position to releasably receive the free marginal end of the pivotal member therein to thereby releasably latch the hinged sections together so that a ball can be captured therewithin. A remote actuator is mounted to the hitch apparatus by which the hinged sections are forced together and thereafter the collar is moved into the latched position over the hinged sections. The remote actuator includes a control lever pivotally mounted for movement respective to said main body. An actuator means is connected to be moved in response to movement of the control lever and is positioned for engaging and retracting the pivotal member into aligned position to enable the collar to be received about the marginal free end thereof. This allows the hitch to be positioned in aligned relationship respective to a ball therefor, the collar moved into a retracted position, the pivotal member engaged by the actuator means and thereby moved into a retracted position, whereupon the collar is released and captures the marginal end of the pivotal member and retracted about a ball.

18 Claims, 2 Drawing Sheets

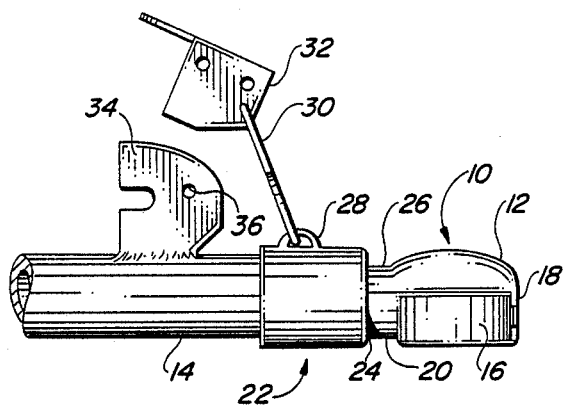
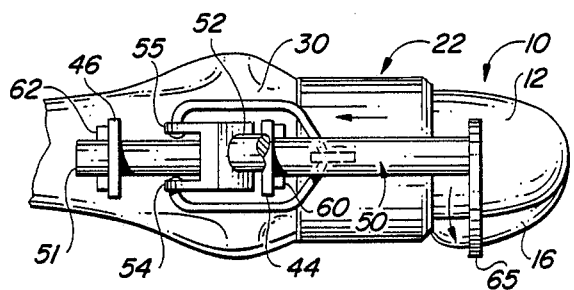
FIG.1 (PRIOR ART)
FIG.3
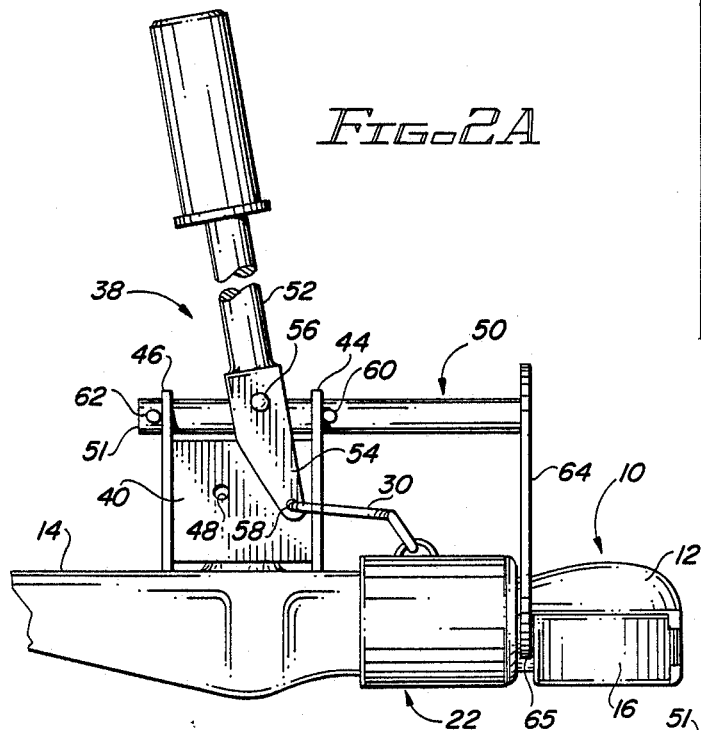
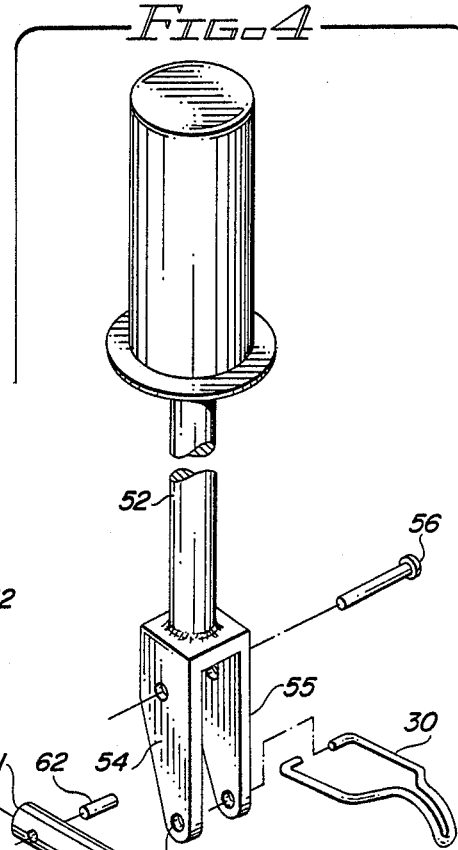
FIG.2A
FIG.4
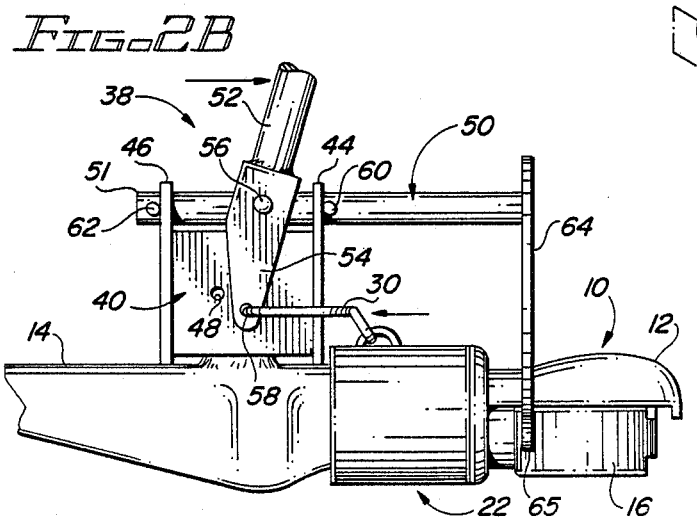
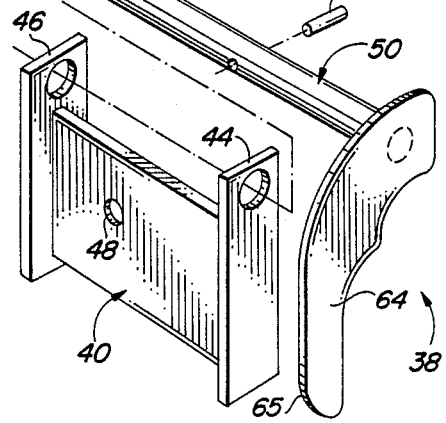
FIG.2B

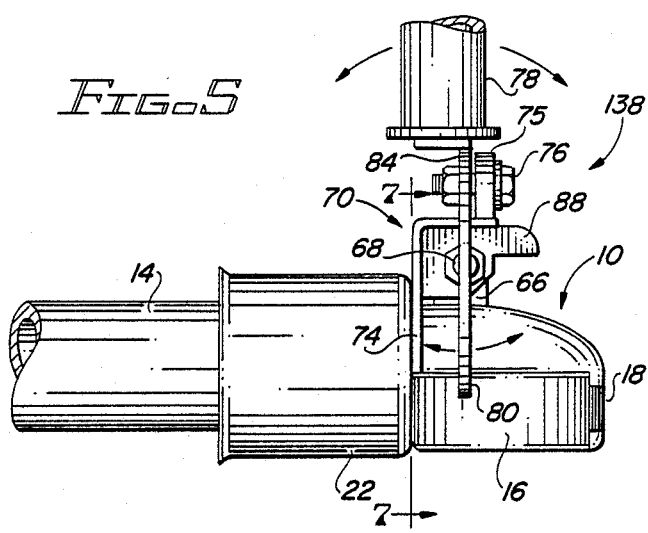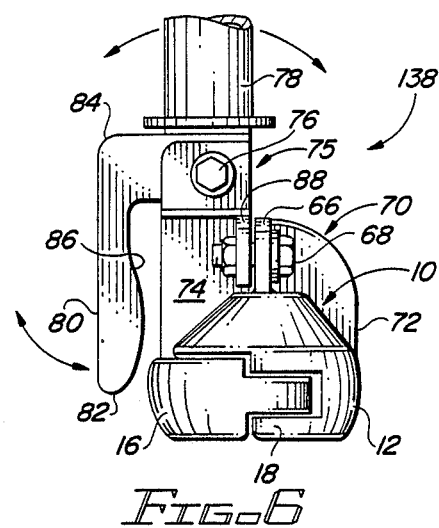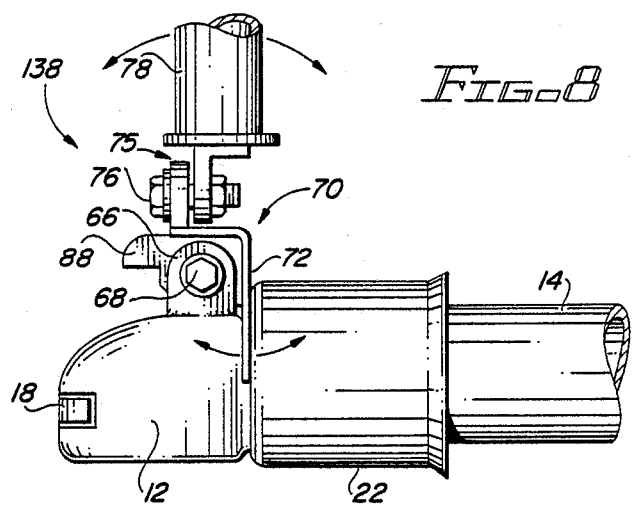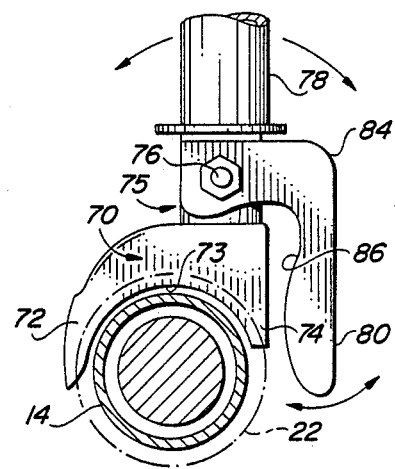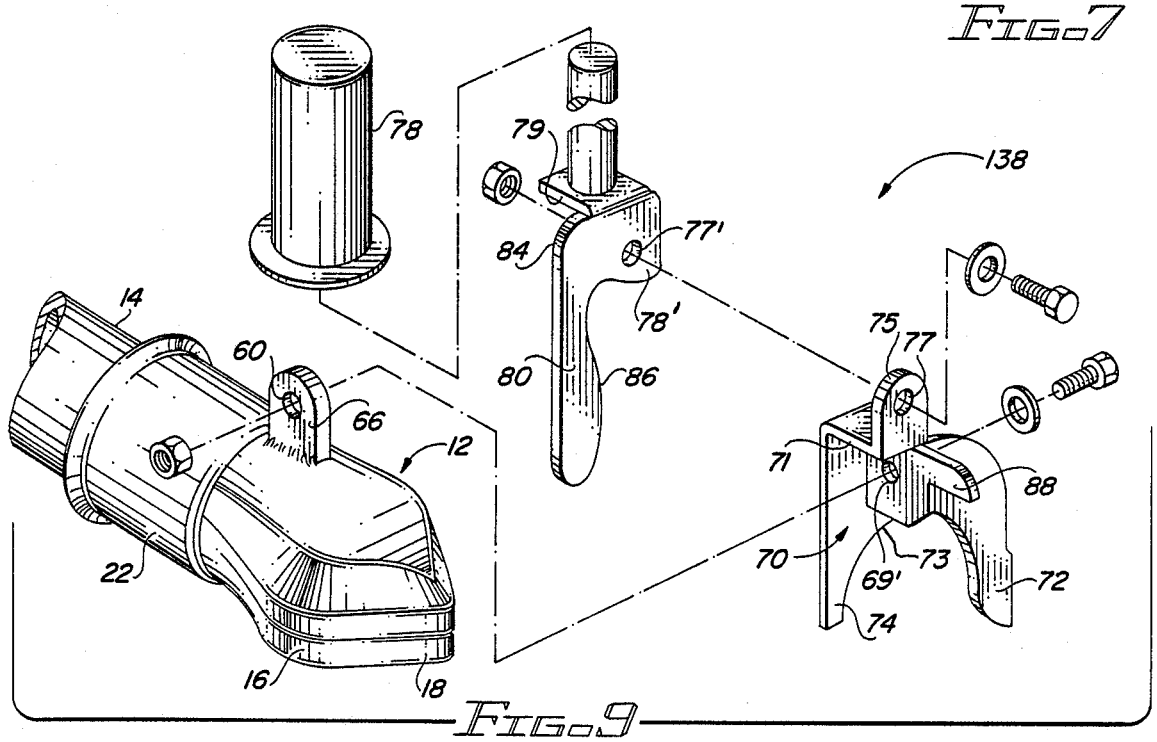

REMOTE OPERATED HITCH APPARATUS

BACKGROUND OF THE DISCLOSURE

Trailer hitches of the type having a ball and socket connection wherein the socket expands to receive the ball and contracts to capture the ball, with there being a spring urged collar securely locking the socket components together, is well known in the art as shown by Jacobs U.S. Pat. No. 1,927,591. This type hitch is very popular and most people, when asked about this particular hitch, will reply that yes, they well know the hitch because many a time they have pinched their fingers between the coacting parts of the hitch as they attempted to connect the ball and socket therefor into operative or inoperative relationship.

Others have realized the dangers involved in this dilemma and have proposed remotely actuating the spring loaded collar, as evidenced by the patent to Nyman U.S. Pat. No. 4,157,190 and the patent to Pierce U.S. Pat. No. 4,133,553.

Nyman shows a spring loaded collar that is forced into the retracted and extended configuration by a lever pivotally attached to the tongue of the hitch and connected to the collar by a bent rod. Further, Nyman discloses an ingenuous means by which movement of the collar causes expansion and contraction of the socket to allow the collar to adapt to variations in thickness of the coupler due to variations in the physical size of the components thereof.

Pierce is similar to Nyman and additionally teaches a clever automatic closing device formed on the front portion of the cap and body so that when the ball is received within the ball cavity, the hitch automatically assumes the closed position and thereafter the collar is moved into the latched position.

It would be desirable to have made available some sort of apparatus associated with a hitch, such as seen in Jacobs, that can be remotely controlled in such a manner that it can be fastened to and unfastened from a ball without ever having to bring the fingers to one's hand into close proximity of the ball, the socket parts, or the collar. Apparatus that enables this desirable goal to be achieved is the subject of the present invention.

SUMMARY OF THE INVENTION

A remote actuator apparatus which can be retrofitted to a prior art hitch of the type comprising an elongated body member provided at one end with a semi-spherical socket, a complementary pivotal socket member hinged to the elongated body member at the forward end of the members, and a spring urged sleeve slidably mounted on said body member for engagement over a marginal free end of said pivotal socket member, thereby latching the pivotal socket member to the body member, and capturing a ball within the socket formed by the two members.

The remote actuator slidably retracts the collar, thereby releasing the pivotal member, whereupon the ball is released from captured relationship respective to the socket.

The remote actuator retracts the collar and then forces the pivotal member into retracted configuration, whereupon release of the collar captures the free end of the pivotal member therewithin, thereby connecting the ball and hitch together.

The rmeote actuator includes a control lever pivotally mounted to the main body member for movement in a longitudinal and lateral direction. The lever is connected to the collar for slidably retracting the collar when the lever is moved longitudinally. The lever is connected to move a curved actuator which engages and moves the pivotal member laterally into retracted configuration when the lever is moved laterally.

In one form of the invention, the lever is pivotally mounted to the main body member for movement in a lateral direction. A curved actuator is affixed to the lever and extends downwardly into operative relationship respective to the pivotal member. Accordingly, lateral movement of the lever moves the curved actuator laterally and into engagement with the pivotal member thereby forcing the pivotal member to be retracted against the main body and in a position to receive a marginal end of the collar over a marginal free end of the pivotal member, thereby latching the hitch in the closed configuration.

The remote actuator further includes means by which said lever is pivotally mounted for longitudinal movement respective to the hitch. Means attached to said lever engages and retracts the collar against a collar spring so that the pivotal member is either released or captured during removal and attachment of the hitch apparatus to a ball.

In one specific embodiment of the invention, a control lever is provided with a yoke which is pivotally mounted to a shaft, with the shaft being mounted for axial rotation to a mount fixture. The mount fixture is retrofitted to a vertical lug located on the main body of the hitch apparatus. A retracting link interconnects the pivotal end of the yoke to the collar so that forward movement of the control lever forces the collar rearwardly into a retracted position thereby releasing the pivotal member from the collar. The shaft is also attached to a curved actuator having a free end extending into proximity of the free end of the pivotal member. Accordingly, lateral movement of the control lever rotates the shaft which in turn pivotally moves the curved actuator into engagement with the pivotal member causing the pivotal member to be forced into a retracted configuration, whereupon movement of the control lever in a rearward direction releases the spring loaded collar which moves forward and captures the free marginal end of the retracted pivotal member therewithin, thereby connecting the hitch to the ball.

A primary object of the present invention is the provision of a remote actuator which can be retrofitted to a prior art type trailer hitch to enable the component parts of the hitch to be remotely manipulated by a single control lever.

Another object of the invention is to provide a remote actuator for connecting and disconnecting a prior hitch to a ball by manipulating a single lever in a longitudinal and a lateral direction respective to the longitudinal axis of the hitch.

A further object of this invention is the provision of a remote actuator by which a prior art hitch can be connected and disconnected from a ball, comprising a control lever mounted to the hitch apparatus in a manner to slide a collar of the hitch into a release position and which enables the hitch to be connected by remotely forcing a pivotal member of the hitch into a retracted position and thereafter releasing the collar over the pivotal member.

A still further object of this invention is the provision of a remote actuator which is attachable to a prior art hitch of the type having a slidable collar which releases a hinged socket member and which thereafter can be used for forcing the hinged socket member into a retracted position whereupon the collar is then moved over the end of the pivotal member and places the hitch into mounted relationship respective to the ball.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a broken, side elevational view of a partially disassembled prior art trailer hitch;

FIG. 2A is a fragmentary, side elevational view of a hitch made in accordance with the present invention;

FIG. 2B is a side elevational view of the hitch disclosed in FIG. 2A showing the hitch in an alternate position of operation;

FIG. 3 is a top plan view of the hitch disclosed in FIGS. 2A and 2B;

FIG. 4 is an enlarged, disassembled view that shows the improvement of the present invention removed from the hitch of FIG. 3;

FIG. 5 is a side elevational view of an alternate embodiment of the present invention;

FIG. 6 is a front view of the apparatus disclosed in FIG. 5;

FIG. 7 is a rear view showing the opposite end of the apparatus seen in FIG. 6;

FIG. 8 is a side elevational view showing the side opposite of the apparatus disclosed in FIG. 5; and, FIG. 9 is an exploded view of the apparatus disclosed in FIGS. 5-8.

DETAILED DESCRIPTION OF THE PREFERRED EMBODIMENTS

In FIG. 1 of the drawings, there is disclosed a prior art hitch 10 having a main body 12 for connection to a ball which may be mounted on the rear of a vehicle, for example. The hitch has a tongue 14 at the rear end thereof which is opposed to a pivotal releasing member 16 which is hinged to the main body 12 at the forward end 18 thereof. A medial part of the main body and the pivotal releasing member is reduced in diameter at 20 for reciprocatingly receiving a spring loaded collar 22 thereon in the illustrated manner of FIG. 1. The marginal free end 24 of the pivotal releasing member is captured by the forward marginal end of the collar in a well known manner. A reduced diameter part 26 of the main body 12, which is cylindrical in cross-section, provides a working area for the collar. A formed eyelet 28 provides a connection means for a retracting link 30. A lever 32 is appropriately apertured and pivotally connected to a vertical lug 34 having a hole 36 therein for pivotally receiving the apertured lever so that the lever can be manipulated in a pivotal manner in order to move the collar 22 in a reciprocating manner.

FIGS. 2A-4 set forth details of a remote actuator 38 made in accordance with the present invention. The remote actuator 38 can be retrofitted to the prior art hitch 10 set forth in FIG. 1. In particular, the remote actuator can be assembled onto some of the existing structure of FIG. 1 as will be more fully appreciated later on as this disclosure is more fully digested.

In FIG. 2A, together with FIGS. 2B, 3, and 4, there is disclosed a mount fixture 40 having a central web which terminates at the opposed sides thereof in fixed relationship respective to a pair of spaced perpendicular plate members 44 and 46. A hole 48 can be brought into alignment with the hole 36 of FIG. 1 in the illustrated manner of FIGS. 2A-3 and thereby retrofit the apparatus disclosed in FIG. 4 to the prior art hitch of FIG. 1.

A rotatable shaft 50 has a rear end 51 that can be telescoped through the illustrated aligned holes of the perpendicular end plates 44, 46 in the illustrated manner of FIGS. 2A-3. A control lever 52 is affixed to the illustrated yoke. The yoke has spaced apart downwardly depending legs 54, 55 which are connected together and to the lever 52 at the upper end thereof. The legs receive the web therebetween with the yoke pivot 56 being placed through the upper apertures of the yoke legs and the central aperture of the shaft 50. Collar retracting link 30 is received in apertures 58 located at the free end of the yoke legs 54, 55. Forward and aft stop pins 60, 62 preferably are a hollow rolled pin that are indexed respective to the vertical end plates 44, 46 to align shaft 50 respective to the mount fixture so that the shaft is pivotally received by the fixture in properly oriented relationship respective to the remainder of the apparatus and to the collar and to the pivotal member.

A curved actuator 64 has a fixed end attached to the end opposite to shaft end 51, and a far end 65 which terminates in spaced relationship to the shaft 50 and which is brought into operative engagement respective to the pivotal member 16.

IN OPERATION

In operation the prior art lever 32 is detached from the retracting link 30 and discarded so that the retracting link can be connected to the holes 58 to the yoke legs in the illustrated manner of FIGS. 2A-3. The mount fixture 40 is bolted onto to the old vertical lug 34 by utilizing the previously provided hole 36 and the hole 48 found in the web member.

The remote actuator 38 manipulates the prior art hitch 10 in the following manner: The control lever 52 is moved longitudinally in a forward direction toward the socket of the hitch thereby forcing the collar to move rearwardly against the collar spring until the free end of the pivotal member is released from the collar and pivots about the pivot pin at 18 thereby releasing any ball from the socket that may have been captured therein. This manipulative exercise enables a person to release the prior art hitch 10 from a ball without the necessity of placing any part of his body in proximity of the moving parts of the hitch apparatus.

In order to connect the hitch to a ball, the control lever 52 is moved toward the socket, thereby moving the retracting link 30 which in turn reciprocates the collar 22 in a rearward direction against its spring biasing means. At this time, the socket of the main body should be nearly resting on a suitable ball. Next, while continuing the forward pressure on the control lever 52, the control lever is moved laterally in a clockwise direction when viewed from the rear, causing the end 65 of the curved actuator 64 to engage and move the pivotal member 16 from the extended position of FIG. 3 into the retracted position of FIG. 2A. The control lever is held in the lateral position to maintain pressure against the pivotal member and simultaneously moved rearwardly thereby allowing the collar spring to force the collar 22 to reciprocate forwardly and thereby receive a marginal terminal end of the pivotal member within the collar which locks the apparatus into the latched position. The control lever can now be released.

THE SECOND EMBODIMENT

FIGS. 5-9 show an alternant embodiment of the present invention. In FIGS. 5-9, there is disclosed a remote actuator 138 made in accordance with the present invention. The remote actuator includes a perpendicular lug 66 affixed to the main body 12 by which the remote actuator 138 is securely mounted respective to the main body 12 of the hitch apparatus. Pivot bolt 68 pivotally mounts a yoke 70 to the perpendicular lug 66. The yoke 70 includes spaced apart legs 72,74 joined together with there being a longitudinally disposed member which provides an aperture 69' through which the bolt 68 is received. The yoke is bent horizontally at 71 and vertically at 75 to provide a mounting ear having aperture 77 formed therein. Apertures 77 and 77' are aligned with one another and receive the illustrated pivot bolt therethrough. The handle 78 is affixed to the curved actuator 80 by means of the horizontal lug 79 which is attached to member 78'.

Curved actuator 80 has a free lower terminal end 82 spaced from upper end 84. Numeral 86 indicates the inner surface of the curved actuator.

As seen in the opposite side views of FIGS. 5 and 8, and the opposite end views of FIGS. 6 and 7, the handle 78 can be moved laterally and at the same time forward and aft, thereby moving the yoke 70 against the collar 72 and concurrently reciprocating the collar against its collar spring (not shown). Pivotal motion occurs about pivot bolt 68 which extends through aperture 69' of the yoke and aperture 60 of the upstanding lug 66.

As seen in the front and rear views of FIGS. 6 and 7, the curved actuator 80 is pivotally moved about pivot bolt 76 as the handle 78 is moved laterally. This causes the inner surface 86 of the curved actuator to bear against the pivoted member 16 and force the member 16 into the retracted position. At this time, the handle 78 should be in the forward position, causing the inner edges of the yoke legs to engage the forward terminal end of the collar and move the collar in a reciprocatory manner until the end of the collar is free of the pivotal member 16. After both the collar 22 and the member 16 have been retracted by the handle 78, the handle 78 can be moved aft, thereby permitting the yoke to release the collar so that the collar moves forward and is received about the marginal free end of the pivotal member 16.

In still another embodiment of this invention, it is contemplated that the curved actuator can be pivotally mounted directly to the handle 78 and to the lug 66, provision being made to change hole axis 60 by 90 degrees so that lateral movement of handle 78 directly moves ths curved actuator 80 laterally against the pivotal member 16. This embodiment of the invention can be used in conjunction with the prior art apparatus of FIG. 1 wherein handle 32 is used to manipulate the collar while handle 78 is moved laterally to manipulate the hinged pivotal member 16.

This is easily achieved in the embodiment of FIGS. 5-9 by over-tightening pivot bolt 68, or alternatively, welding the yoke 70 directly to the lug 66 so that the curved actuator is free to pivot against the hinged member while the yoke is rendered inactive.

I claim:

1. A trailer hitch of the type having a main body, a ball receiving socket at one end of the main body and the other end of the main body being attachable to the end of a tongue, for example; a pivotal member, hinge means at the ball receiving socket end by which said main body and said pivotal member form hinged sections; said socket is formed jointly in said hinged sections; a collar reciprocatingly received about said main body and positioned to releasably receive the free marginal end of said pivotal member therein to thereby releasably latch the hinged sections together so that a ball can be captured therein; the improvement comprising:

a remote actuator by which the hinged sections are forced together to enable the collar to be moved into the latched position; said actuator includes a control lever, means pivotally mounting said control lever for movement respective to said main body; actuator means connected to be moved in response to movement of said control lever, said actuator means being positioned for engaging and retracting said pivotal member into aligned position to enable said collar to be received about the marginal free end thereof; whereby, said hitch can be positioned in aligned relationship respective to a ball therefor, the collar moved into a retracted position, the pivotal member engaged by the actuator means and thereby moved into a retracted position, whereupon the collar is released and captures the marginal end of the pivotal member with the hinged sections being retracted about a ball.

2. The improvement of claim 1 wherein said actuator means is an elongated arm having one end pivotally connected to said main body and a free end mounted to move against said pivotal member and forces the pivotal member laterally against said main body and into the retracted configuration.

3. The improvement of claim 1 wherein said hinge is a vertical pin that mounts the pivotal member to swing in a horizontal plane; said pivotal member has a reduced thickness at the free marginal end thereof that is engaged by the free marginal end of the actuator means and which is enclosed by the end of the collar.

4. The improvement of claim 1 wherein said control lever is mounted for lateral and longitudinal movement; means connected to said lever by which longitudinal movement thereof forces the collar to retract and thereby release the free end of the pivotal member therefrom; while lateral movement of the control lever forces the actuator actuator into operative engagement with the pivotal member.

5. The improvement of claim 1 wherein said control lever is mounted for longitudinal and lateral movement respective to the longitudinal axis of the main body, means by which said control lever, when moved longitudinally, retracts said collar whereby said control lever moves longitudinally to retract said collar and moves laterally to retract said pivotal member; and said control lever moves longitudinally to release said collar from the end of the pivotal member.

6. The improvement of claim 1 wherein there is a lug on said main body, a mount fixture attached to said lug, said control lever is supported by said mount fixture, a retract link attached to said collar and to said lever for effecting longitudinal movement of said collar, said actuator is moved laterally by lateral movement of said lever.

7. In a trailer hitch comprising a main body having a hinge at one end thereof which is opposed to a shank at the other end thereof, a semi-spherical socket formed in the hinge end;

a pivotal member attached to said hinge for moving in a horizontal plane from closed to open position, a collar slidably received on said main body for capturing the free marginal end of said pivotal member therein; a semi-spherical socket formed in said pivotal member which cooperates with the semi-spherical socket of the main body to form a ball receiving socket for releasably capturing a ball therein when the pivotal member is closed;

the combination with said trailer hitch of a remote actuator by which the collar is retracted and the pivotal member is closed and thereafter the collar is extended to latch said pivotal member to said main body with a ball being captured within the ball receiving socket; said remote actuator includes a control lever, mount means by which said lever is mounted for pivotal movement to said main body, actuator means connecting said lever for moving said pivotal member into the closed position respective to the main body, whereby:

said collar can be slidably retracted, said lever pivoted to cause said actuator means to engage and move the pivotal member into the closed position, and the collar released to latch the pivotal member to the main body with a ball being captured within the socket.

8. The improvement of claim 7 wherein said actuator means is an elongated arm having one end pivotally connected to said main body and a free end mounted to move against said pivotal member and force the pivotal member laterally against said main body and into the closed configuration.

9. The improvement of claim 7 wherein said hinge is a vertical pin that mounts the pivotal member to swing in a horizontal plane; said pivotal member has a reduced thickness at the free marginal end thereof that is engaged by the free marginal end of the actuator and which is enclosed by the end of the collar.

10. The improvement of claim 7 wherein said control lever is mounted for lateral and longitudinal movement; means connected to said lever by which longitudinal movement thereof forces the collar to retract and thereby release the free end of the pivotal member therefrom; while lateral movement of the control lever forces actuator means into operative engagement with the pivotal member.

11. The improvement of claim 7 wherein said control lever is mounted for longitudinal and lateral movement respective to the longitudinal axis of the main body, means by which said control lever, when moved longitudinally, retracts said collar whereby said control lever moves longitudinally to retract said collar and moves laterally to close said pivotal member; and said control lever moves longitudinally to release said collar from the end of the pivotal member.

12. The improvement of claim 7 wherein there is a lug on said main body, a mount fixture attached to said lug, said control lever is supported by said mount fixture, a retract link attached to said collar and to said lever for longitudinal movement, said actuator is moved laterally by lateral movement of said lever.

13. In a trailer hitch of the type having a main body, a ball receiving socket at one end of the main body and the other end of the main body being attachable to the end of a tongue, for example; a pivotal member, hinge means at the ball receiving socket end by which said main body and said pivotal member form hinged sections; said socket is formed jointly in said hinged sections; a collar reciprocatingly received about said main body and positioned to releasably receive the free marginal end of said pivotal member therein to thereby releasably latch the hinged sections together so that a ball can be captured within said socket; the combination with said hitch of a remote actuator for connecting and disconnecting said hitch to a ball comprising:

an elongated actuator means by which the hinged sections are forced together to enable the collar to be moved into the latched position; said actuator means is connected to be moved by a control lever, means pivotally mounting said control lever for movement respective to said main body; said elongated actuator means is connected to be moved in response to movement of said control lever, said elongated actuator means being positioned for engaging and retracting said pivotal member into aligned latched position to enable said collar to be received about the marginal free end thereof; whereby, said hitch can be positioned in aligned relationship respective to a ball therefor, the collar moved into a retracted position, the pivotal member engaged by the elongated actuator means and thereby moved into a latched position, whereupon the collar is released and captures the marginal end of the pivotal member and latches the socket of the hitch about a ball.

14. The combination of claim 13 wherein said elongated actuator means is an elongated arm having one end pivotally connected to said main body and a free end mounted to move against said pivotal member and force the pivotal member laterally against said main body and into the latched configuration.

15. The combination of claim 14 wherein said hinge is a vertical pin that mounts the pivotal member to swing in a horizontal plane; said pivotal member has a reduced thickness at the free marginal end thereof that is engaged by the free marginal end of the actuator and which is enclosed by the end of the collar.

16. The combination of claim 15 wherein said control lever is mounted for lateral and longitudinal movement; means connected to said lever by which longitudinal movement thereof forces the collar to retract and thereby release the free end of the pivotal member therefrom; while lateral movement of the control lever forces the curved actuator into operative engagement with the pivotal member.

17. The combination of claim 13 wherein said control lever is mounted for longitudinal and lateral movement respective to the longitudinal axis of the main body, means by which said control lever, when moved longitudinally, retracts said collar whereby said control lever moves longitudinally to retract said collar and moves laterally to retract said pivotal member; and said control lever moves longitudinally to release said collar from the end of the pivotal member.

18. The combination of claim 14 wherein there is a lug on said main body, a mount fixture attached to said lug, said control lever is supported by said mount fixture, a retract link attached to said collar and to said lever for longitudinal movement, said elongated actuator means is moved laterally by lateral movement of said lever.

* * * * *

UNITED STATES PATENT AND TRADEMARK OFFICE
CERTIFICATE OF CORRECTION

PATENT NO. : 4,804,204

DATED : FEBRUARY 14, 1989

INVENTOR(S) : JOHNNY C. ELKINS

It is certified that error appears in the above-identified patent and that said Letters Patent is hereby corrected as shown below:

Column 1, line 41, substitute --of-- for "to", second occurrence.

Column 4, line 39, substitute --of-- for "to", second occurrence.

Column 5, line 34, substitute --22-- for "72".

Column 6, line 39, insert --means-- after "hinge";

Line 43, delete --means-- after "actuator";

Line 51, substitute --means-- for "actuator", second occurrence.

Column 7, line 49, insert --the-- after "forces".

Signed and Sealed this

Twelfth Day of December, 1989

Attest:

JEFFREY M. SAMUELS

*Attesting Officer*     *Acting Commissioner of Patents and Trademarks*